ic Deviint Stat

United States Patent
Butter

[11] 3,765,750
[45] Oct. 16, 1973

[54] ACOUSTO-OPTIC DEVICE
[75] Inventor: Charles D. Butter, Eden Prairie, Minn.
[73] Assignee: Honeywell, Inc., Minneapolis, Minn.
[22] Filed: Nov. 1, 1972
[21] Appl. No.: 302,719

[52] U.S. Cl. .............................................. 350/161
[51] Int. Cl. ............................................ G02f 1/34
[58] Field of Search ........................... 350/160, 161

[56] References Cited
UNITED STATES PATENTS
2,754,238   7/1956   Arenberg ........................... 350/161
3,653,746   4/1972   Warner, Jr. ......................... 350/161

Primary Examiner—William L. Sikes
Attorney—Lamont B. Koontz et al.

[57] ABSTRACT

Acousto-optic devices having improved bandwidth are prepared by a simplified process. A thin metal layer is interposed between the piezoelectric transducer and the acousto-optic medium. Clamping means place the transducer and thin metal layer under compression.

10 Claims, 7 Drawing Figures

PATENTED OCT 16 1973 3,765,750
SHEET 1 OF 3
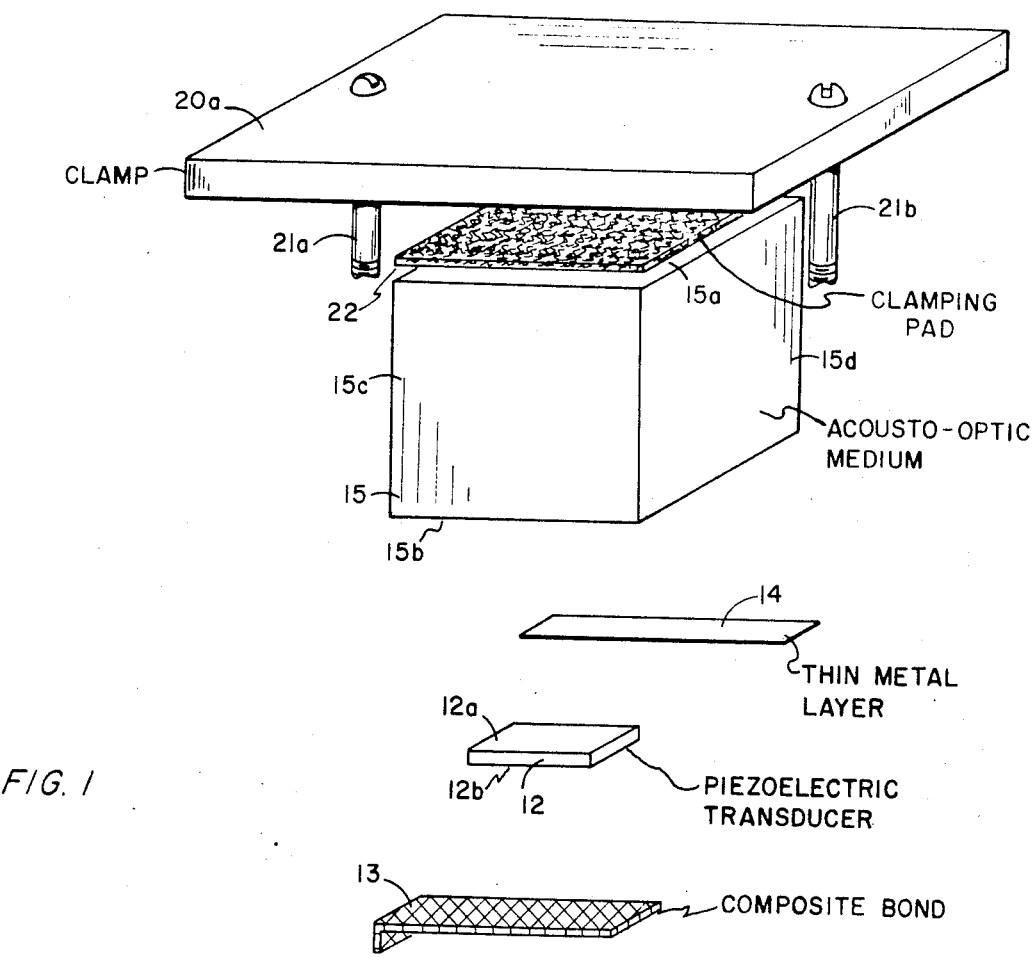
FIG. 1
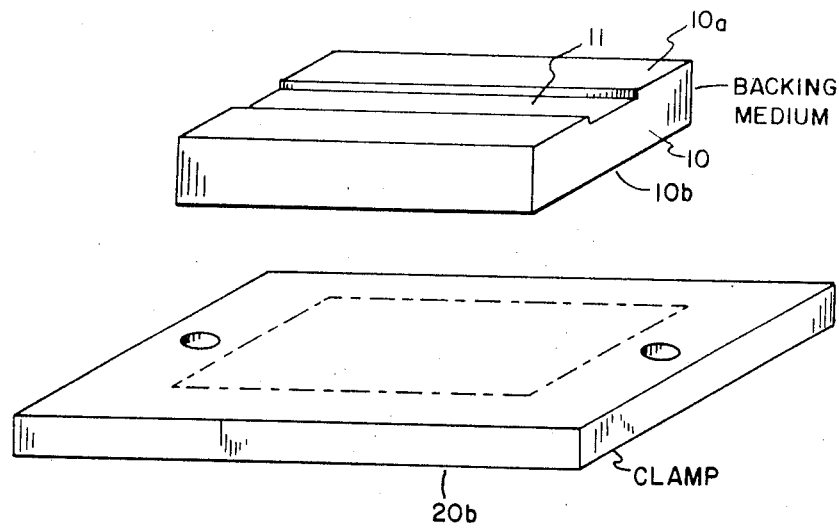

ANGLE GROUND 3,765,750

ACOUSTO-OPTIC DEVICE

BACKGROUND OF THE INVENTION

The present invention is related to acousto-optic devices. In particular, the present invention teaches acousto-optic devices having improved bandwidth characteristics which are fabricated by a simplified procedure.

Acousto-optic light beam modulators and deflectors have been the object of considerable research in recent years. These acousto-optic devices have been found particularly useful in a variety of optical systems including laser displays, optical memories, and information processing. The design and operation of acousto-optic devices was described in some detail by E. I. Gordon, "A Review of Acoustooptical Deflection and Modulation Devices," *IEEE Proceedings*, 54, 1391 (1966), and D. A. Pinnow, "Acousto-Optic Light Deflection: Design Considerations for First Order Beam Steering Transducers," *IEEE Transactions on Sonics and Ultrasonics*, SU–18, 209 (1971).

Acousto-optic devices depend upon the interaction of an acoustic and an electromagnetic wave within an acousto-optic medium. The acoustic wave creates, in essence, a diffraction grating within the acousto-optic medium. The angle of diffraction of the electromagnetic wave is controlled by the frequency of the acoustic beam. Since the angle of diffraction generally increases with frequency, it has been highly advantageous to utilize acoustic beams having frequencies in excess of 100 MHz.

Although an acoustic beam may be generated by a variety of means, including electrostrictive and magnetostrictive transducers, the most common technique for generating an acoustic beam is to electrically drive a piezoelectric transducer which is bonded to a suitable acousto-optic medium. In the prior art, severe technical problems have been encountered in bonding the piezoelectric transducer to the acoustic medium.

First, to provide frequencies in excess of 100 MHz the thickness of the piezoelectric transducer must be extremely small. For example, a piezoelectric transducer capable of providing a center frequency of 170 MHz has a preferred thickness of about 20 microns. The extremely thin transducers complicate fabrication of acousto-optic devices.

Second, the acoustic impedances of the piezoelectric transducer and the acoustic medium are generally different. For best performance, the bond between the piezoelectric transducer and the acousto-optic medium should provide acoustic impedance matching. The ideal impedance of the bonding material is equal to the square root of the product of the impedance of the acousto-optic medium and the piezoelectric transducer. It has proved very difficult, however, to select a bonding material which has this ideal acoustic impedance.

Third, the bond must have excellent mechanical strength to withstand vibration of the piezoelectric transducer at frequencies in excess of 100 MHz. The mechanical strength of the bond is also important because the piezoelectric transducers are typically bonded to the acoustic medium and then ground to the desired thickness. While this eliminates handling of extremely thin transducers, it places severe requirements on the mechanical strength of the bond.

Indium bonds have been widely used for ultrasonic devices operating at frequencies beyond 100 MHz. Thermocompression bonding techniques using indium were described by J. R. Chase and J. A. Rimer in U. S. Pat. No. 3,590,467, and E. K. Sittig et al. "Bonded piezoelectric transducers for frequencies beyond 100MHz," *Ultrasonics*, page 108 (1969). Indium cold welding techniques were described by E. K. Sittig and H. D. Cook "A Method for Preparing and Bonding Ultrasonic Transducers Used in High Frequency Digital Delay Lines," *IEEE Proceedings*, page 1375 (1968), and by A. W. Warner and A. H. Meitzler, "Performance of Bonded, Single-Crystal $LiNbO_3$ and $LiGaO_2$ as Ultrasonic Transducers Operating Above 100 MHz," *IEEE Proceedings*, page 1376 (1968).

The indium bonding techniques, however, have some disadvantages. The transducer is generally lapped or polished to the desired thickness after the bond has been made. It has been found that the indium bond, though successfully made (as judged by the shear force which it could sustain without failure), often fails while the thickness of the transducer is being reduced. In addition, reducing the thickness of the transducer after the bond has been made requires that the acousto-optic medium, which is often quite expensive, must be handled in a slurry of grit used to prepare the transducer.

Still another disadvantage of the indium bonding techniques is that the acousto-optic medium is subjected to large force during the bonding process. This can result in cracks or other damage to the acousto-optic medium.

SUMMARY OF THE INVENTION

In the present invention, a simplified procedure is used to make acousto-optic devices. The resulting devices have bandwidth characteristics comparable to or better than the prior art bonding techniques.

The acousto-optic device of the present invention is formed by forming a recess in a surface of a backing material. The depth of the recess is equal to the thickness of a bond between the backing material and the piezoelectric transducer and the desired thickness of the transducer. A body of piezoelectric transducer material is then bonded into the recess, and a portion of transducer material extends above the surface of the backing material. The transducer material extending above the surface of the backing material is then removed. A thin metal layer is deposited onto the transducer material, and the backing medium, transducer, and acousto-optic medium are clamped together. In this manner the transducer and thin metal layer are placed under compression.

BRIEF DESCRIPTION OF THE DRAWING

FIG. 1 is an exploded view of the acousto-optic device of the present invention.

DETAILED DESCRIPTION OF THE PREFERRED EMBODIMENT

Figure 3:
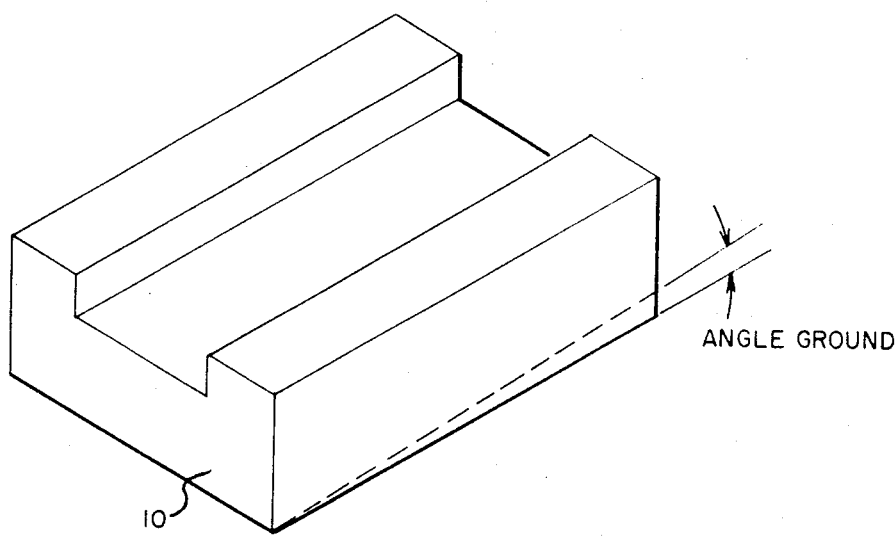
FIG. 3 shows a backing medium with a recess in one surface.

In FIG. 1, an exploded view of an acousto-optic device of the present invention is shown. Backing medium 10 has first and second surfaces 10a and 10b. A recess 11 is formed in first surface 10a. Although recess 11 is shown as a channel formed in backing medium 10, it is to be understood that recess 11 may take other forms. Piezoelectric transducer 12 is mounted in recess 11. Surface 12a of piezoelectric transducer 12 is essentially coplanar with first surface 10a of backing block 10. Piezoelectric transducer 12 is bonded into recess 11 by bond 13. Although many different bonds may be used, bond 13 is preferrably a polymerizable plastic-perforate metal sheet composite bond of the type described by my co-pending patent application Ser. No. 135,287 filed Apr. 19, 1971, which is assigned to the same assignee as the present invention. The composite bond also forms a first electrode to piezoelectric transducer 12. If a bond which is not electrically conductive is used, the first electrode must be separately provided.

Thin metal layer 14 is positioned between surface 12a of piezoelectric transducer 12 and surface 15b of acousto-optic medium 15. Thin metal layer 14 is preferably indium, but may be silver, copper or other metals or metal alloys. Thin metal layer 14 forms a second electrode to piezoelectric transducer 12. Acousto-optic medium 15 may comprise an acousto-optic crystal such as alpha iodic acid or lead molybdate, or an acousto-optic glass material.

Clamping means clamp the entire assembly together thus placing piezoelectric transducer 12 and thin metal layer 14 under compression. The thin metal layer 14 is in intimate contact with piezoelectric transducer 12 and acousto-optic medium 15 and acoustic waves may be transmitted into acousto-optic medium 15 by applying an electrical signal between the electrodes.

As shown in FIG. 1, the clamping means comprises rigid metal plates 20a and 20b, screws 21a and 21b, and clamping pad 22. Clamping pad 22, which may comprise a paper card, is interposed between surface 15a of acousto-optic medium 15 and rigid metal plate 20a to prevent high localized stresses from being applied to acousto-optic medium 15. Although the particular clamping means shown in FIG. 1 have been found particularly useful in the present invention, it should be understood that the clamping means may take other forms as well.

The present invention has several advantages. First, since thin metal layer 14 is under compression during operation of the acousto-optic device, it need not exhibit tensile strength in order to achieve the acoustic coupling necessary for good bandwidth characteristics. Second, transducer 12 is heat sinked on both sides and is heavily damped. Third, the acousto-optic device can be made by a simplified procedure.

In one successful embodiment of the present invention, piezoelectric transducer 12 was a 35° Y cut lithium niobate crystal having a surface area of 2.5 mm$^2$ and a thickness of about 20 microns, thus providing a 170 MHz center frequency. The acousto-optic medium 15 was a lead molybdate crystal and backing medium 10 was fused quartz. Bond 13 was a polymerizable plastic-perforate metal sheet composite bond having a thickness of about 6 microns. The perforate metal sheet was an electro-formed copper mesh having 750 lines per inch and 55 percent open area, which was manufactured by Buckbee Mears Company. The polymerizable plastic was Epon 815 epoxy with a diethylaminopropylamine hardener which was manufactured by Shell Chemical Company. Thin metal layer 14 was indium.

Figure 2:
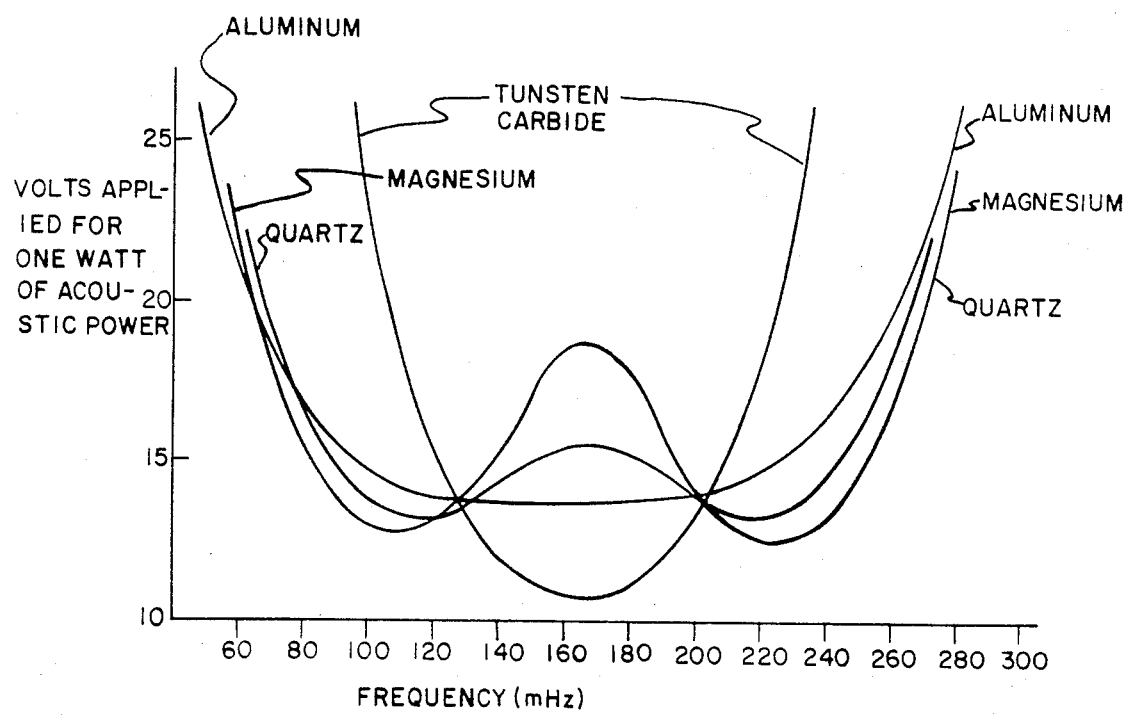
FIG. 2 graphically shows the frequency response of acousto-optic devices of the present invention for various backing materials.

It has been found that the selection of the material comprising backing medium 10 greatly influences the performance of the acousto-optic device. FIG. 2 shows the calculated voltage required to send one watt of acoustic power into an acousto-optic medium as a function of excitation frequency for various backing materials. In each case the acousto-optic device was similar to the successful embodiment described above except for the particular backing material used. The backing materials depicted in FIG. 2 are magnesium, with an acoustic impedance of $10 \times 10^5 Kg/m^2$ sec; quartz, with an acoustic impedance of $13.1 \times 10^5 Kg/m^2$ sec; aluminum, with an acoustic impedance of $17.3 \times 10^5 Kg/m^2$ sec; and tungsten carbide, with an acoustic impedance of $91 \times 10^5 Kg/m^2$ sec. It can be seen from FIG. 2 that with the proper selection of backing material, a very large bandwidth to center frequency ratio can be achieved.

One disadvantage of the present invention is that it requires approximately twice as much power as an acousto-optic device without a backing medium. The additional power is required in the present invention because approximately one-half of the acoustic energy produced by piezoelectric transducer 12 is transmitted into backing medium 10 and does not interact with the light beam. It is believed, however, that this disadvantage is more than overcome by the improved bandwidth response and simplified fabrication technique of the present invention.

An important advantage of the acousto-optic device of FIG. 1 is the ease of fabrication of the device. The first step in the process is the preparation of backing medium 10. A block of backing material such as quartz is mounted on an angle plate which can be then mounted on a surface grinder table. The quartz block is ground with a 600 grit diamond wheel to obtain plane surfaces 10a and 10b. In one preferred embodiment surfaces 10a and 10b are made non-parallel so that acoustic waves reflected from surfacd 10b travel in a direction which does not satisfy the Bragg condition and therefore will not interact with the light beam. A recess is then cut in surface 10a with a diamond wheel. For ease of preparation, recess 11 is in the form of a channel. The depth of the recess is equal to the sum of the thickness of bond 13 and the desired thickness of transducer 12. Thus it is possible to determine the final thickness of transducer 12 by varying the depth of recess 11. One important advantage of the present method is that the thickness of transducer 12 is determined by a precision grinding machine in a rapid and precise manner. FIG. 3 shows backing medium 10 after recess 11 has been formed. For the purpose of illustration, the depth of recess 11 has been greatly exaggerated.

Figure 4A:
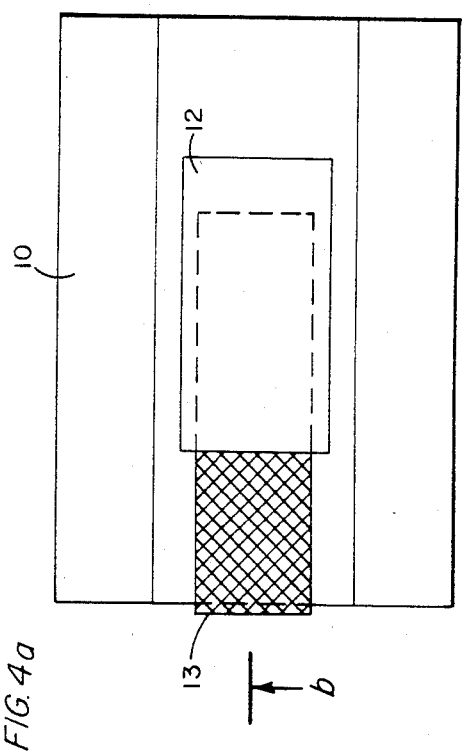
FIGS. 4a and 4b show top and cross sectional views, respectively, of a backing medium with a body of piezoelectric material bonded into the recess.
Figure 4B:
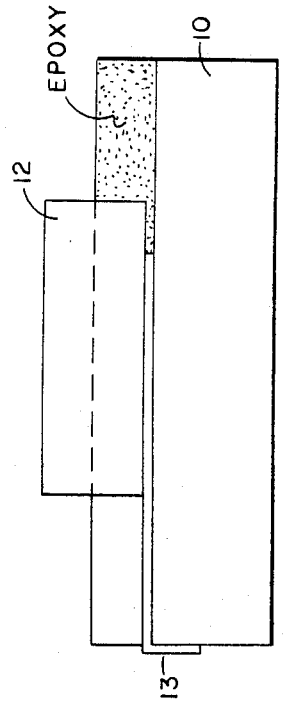

A body of piezoelectric material is then bonded into the recess 11. The transducer material extends above the surface 10a. In one preferred embodiment, bond 13 is a composite perforate metal sheet-polymerizable plastic bond. The perforate metal sheet is placed in the recess to extend under about 80 to 90 percent of piezoelectric transducer 12. The other end of perforate metal sheet extends past the end of recess 11 and is bent against one end of backing medium 10 to facilitate electrical contact. A polymerizable plastic material such as epoxy is placed on top of the perforate metal sheet so that the interstices or open spaces in the perforate metal sheet are filled with polymerizable plastic. Transducer 12 is then placed on top of the perforate metal sheet and polymerizable plastic so that it becomes fixed to backing medium 10. As shown in FIGS. 4a and 4b, the remainder of the recess is filled with epoxy.

The piezoelectric transducer material extending above surface 10a of backing medium 10 is then removed so that surface 12a of transducer 12 is coplanar with surface 10a. The removal of the excess transducer material may be achieved by lapping or by any other suitable removal technique. It has been found, however, that the excess transducer material may be removed by hand lapping in a very short time.

Figure 5A:
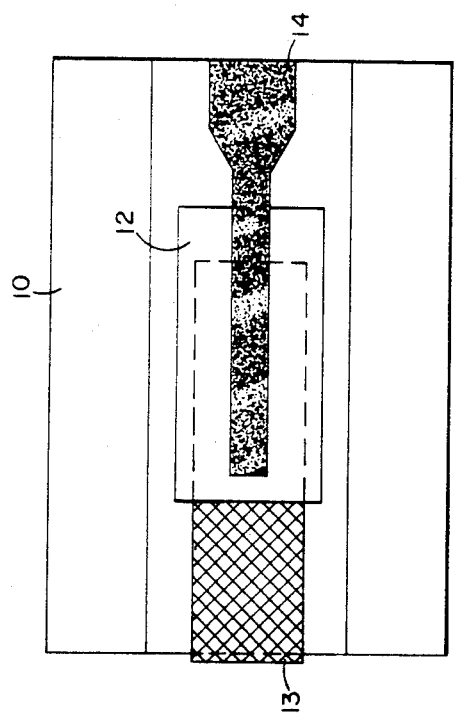
FIGS. 5a and 5b show the thin metal layer forming a single electrode and an electrode array, respectively.
Figure 5B:
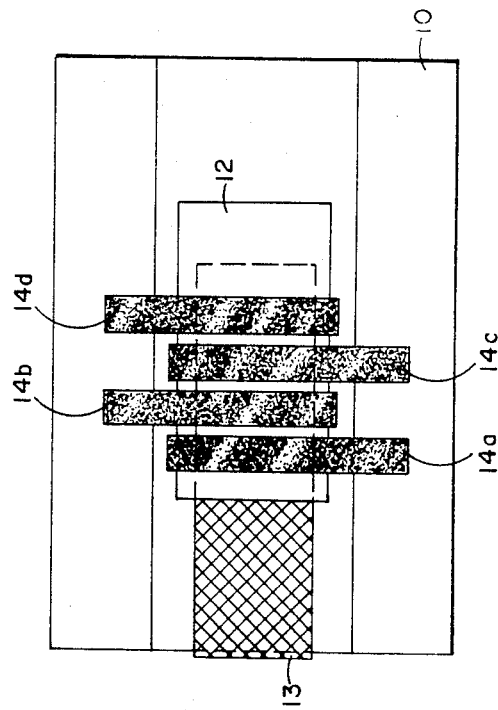

A thin metal layer is then deposited onto surface 12a of transducer 12 and on the epoxy adjacent to the transducer. The thin metal film may be in the form of a single electrode, as shown in FIG. 5, or in the form of a pluraility of discrete regions, as shown in FIG. 5b. In the embodiment shown in FIG. 5b, each discrete region forms a separate electrode to surface 12a. Each portion of piezoelectric transducer between the common back electrode formed by the perforate metal sheet and one of the individual electrodes acts as a separate transducer. If the signals used to excite the various electrodes are properly phased, acoustic beam steering is accomplished. The desirability of beam steering in an acousto-optic device is described by D. A. Pinnow in "Acousto-Optic Light Deflection: Design Considerations for First Order Beam Steering Transducers," *IEEE Transaction on Sonics and Ultrasonics*, SU-18, 209 (1971). Electrical leads are then attached to the perforate metal sheet and to the electrodes formed by thin metal film 14 by means of a conductive silver epoxy.

The piezoelectric transducer assembly is now ready for mounting on acousto-optic medium 15. Acousto-optic medium 15 has three polished surfaces: surfaces 15c and 15d through which the light beam passes, and surface 15b to which transducer 12 is applied. As in the case of backing medium 10, in one preferred embodiment surfaces 15a and 15b are non-parallel. Surface 15a is "angle lapped" at about 5° so that the acoustic waves reflected from the surface 15a will be traveling the direction that will not satisfy the Bragg condition and thus will not interact with the light beam.

Backing medium 10 and acousto-optic medium 15 are placed between rigid metal plates 20a and 20b, and clamping pad 22 is interposed between surface 15a and rigid metal plate 20a. Metal plates 20a and 20b are then drawn together by screws 21a and 21b. When screws 21a and 21b are tightened down, the success of the contact of thin metal layer 14 with acousto-optic medium 15 can be checked by looking at surface 15b through acousto-optic medium 15. Those portions of acousto-optic medium 15 that are in intimate contact with thin metal layer 14 will no longer totally reflect light by total internal reflection and the electrode pattern can be clearly seen.

While this invention has been disclosed with particular reference to the preferred embodiments, it will be understood by those skilled in the art that changes in form and detail may be made without departing from the spirit and scope of the present invention.

The embodiments of the invention in which an exclusive property or right is claimed are defined as follows:

1. An acousto-optic device comprising:
   a backing medium having first and second surfaces and having a recess in the first surface;
   a piezoelectric transducer having third and fourth surfaces, the piezoelectric transducer being positioned in the recess with the third surface being essentially coplanar with the first surface;
   a bond between the recessed portion of the first surface and the fourth surface;
   an electrode attached to the fourth surface;
   an acousto-optic medium having fifth and sixth surfaces;
   a thin metal layer between the third and sixth surfaces, the thin metal layer forming an electrode to the third surface; and
   clamping means for clamping the backing medium, transducer and acousto-optic medium together, thereby placing the transducer and thin metal layer under compression.

2. The acousto-optic device of claim 1 wherein the bond forms the electrode attached to the fourth surface.

3. The acousto-optic device in claim 2 wherein the bond comprises:
   a perforate metal sheet positioned between the fourth surface and the recessed portion of the first surface and forming the electrode to the fourth surface, the perforate metal sheet having a plurality of openings therein; and
   a polymerizable plastic material filling the openings of the perforate metal sheet and adhering to the fourth surface and the recessed portion of the first surface, the perforate metal sheet and the polymerizable plastic material forming a composite bond.

4. The acousto-optic device of claim 3 wherein the polymerizable plastic material is epoxy.

5. The acousto-optic device of claim 1 wherein the backing block is quartz.

6. The acousto-optic device of claim 1 wherein the first and second surfaces are non-parallel so that acoustic waves reflected from the second surface travel in a direction which does not satisfy the Bragg condition.

7. The acousto-optic device of claim 1 wherein the sixth and fifth surfaces are non-parallel so that acoustic waves reflected from the fifth surface travel in a direction which does not satisfy the Bragg condition.

8. The acousto-optic device of claim 1 wherein the thin metal layer is indium.

9. The acousto-optic device of claim 1 wherein the piezoelectric transducer is lithium niobate, the backing medium is quartz, the thin metal layer is indium, and the acousto-optic medium is lead molybdate.

10. The acousto-optic device of claim 1 wherein the thin metal layer comprises a plurality of discrete regions, each discrete region forming a separage electrode to the third surface.

* * * * *

UNITED STATES PATENT OFFICE
CERTIFICATE OF CORRECTION

Patent No. 3,765,750          Dated October 16, 1973

Inventor(s) Charles D. Butter

It is certified that error appears in the above-identified patent and that said Letters Patent are hereby corrected as shown below:

In Column 2, line 38, after "than" insert--devices produced by--. In Column 5, line 23, after "FIG." delete "5" and insert therefor--5a--.

Signed and sealed this 27th day of August 1974.

(SEAL)
Attest:

McCOY M. GIBSON, JR.            C. MARSHALL DANN
Attesting Officer               Commissioner of Patents